A. E. KEITH & M. SETTER.
SHOCK OR VIBRATION ABSORBING APPARATUS FOR VIBRATING BODIES OR VEHICLES.
APPLICATION FILED JAN. 28, 1913.
1,189,829. Patented July 4, 1916.
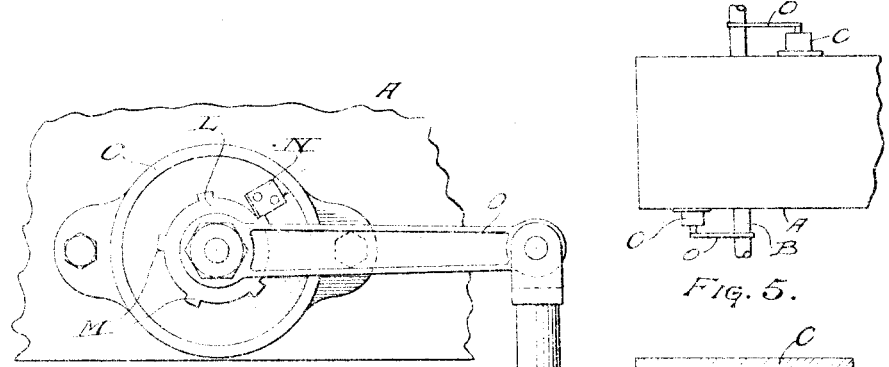
FIG. 5.
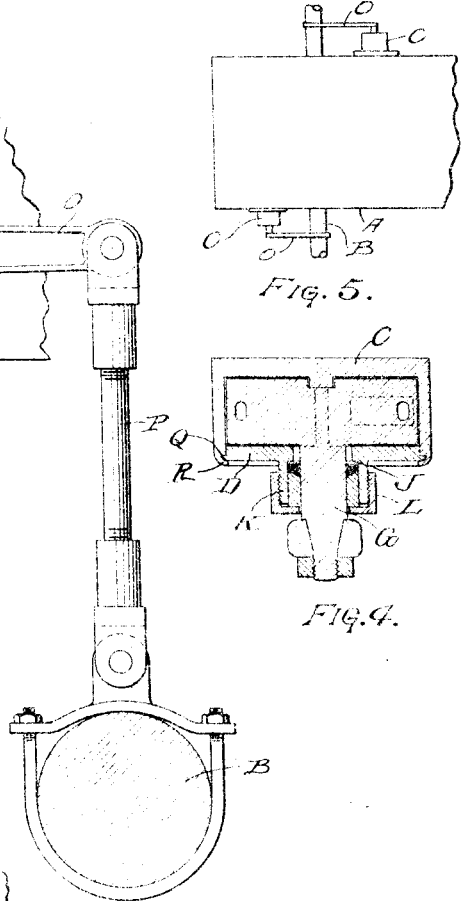
FIG. 1.
FIG. 4.
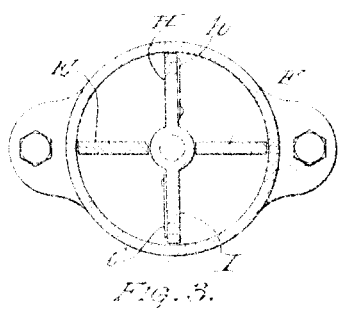
FIG. 3.
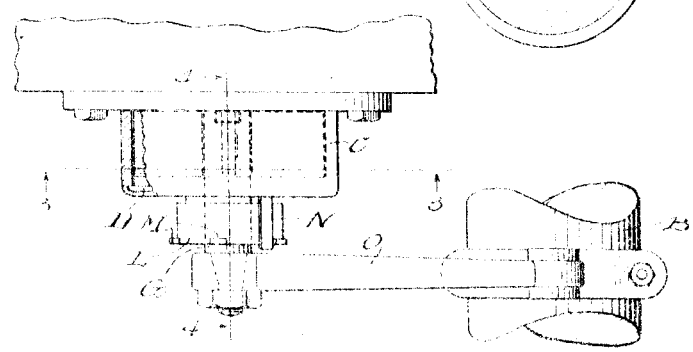
FIG. 2.
WITNESSES
INVENTORS

UNITED STATES PATENT OFFICE.

ALEXANDER E. KEITH, OF HINSDALE, AND MICHAEL SETTER, OF CHICAGO, ILLINOIS.

SHOCK OR VIBRATION ABSORBING APPARATUS FOR VIBRATING BODIES OR VEHICLES.

1,189,829.

Specification of Letters Patent.

Patented July 4, 1916.

Application filed January 28, 1913. Serial No. 744,658.

*To all whom it may concern:*

Be it known that we, ALEXANDER E. KEITH, of Hinsdale, Dupage county, Illinois, and MICHAEL SETTER, of Chicago, Cook county, Illinois, have invented certain new and useful Improvements in Shock or Vibration Absorbing Apparatus for Vibrating Bodies or Vehicles, of which the following is a specification.

This invention relates to that type of apparatus designed to be interposed between two relatively movable bodies, a movement in one of which causes a corresponding movement in the other, as for example, between the body and axle of a vehicle, such as an automobile, for the purpose of reducing or retarding, or both reducing and retarding the movement of the responding member. Such a device, when applied to a vehicle, will enable it to run over a comparatively rough road and yet prevent the rider from being disagreeably jolted.

Among the objects of our invention are to provide a form of shock absorber that is both strong and comparatively cheap to manufacture; to provide a form, the fluids in which will not leak and the parts of which will not be liable to work loose and which may be conveniently and effectively fastened in working position; to provide a form, the fluid chamber of which may be bored by a simple and inexpensive operation; to provide a form which may be interchangeably used on either side of a vehicle; to provide a more satisfactory and efficient shock absorber than heretofore and to provide details of improvement tending to increase the efficiency and serviceability of a shock absorber of the above character.

Our invention, to accomplish the foregoing and other useful ends, consists in matters hereinafter set forth and claimed.

In the accompanying drawings, Figures 1 and 2 are an elevation and plan, respectively, of the device, and show one manner in which it may be applied to a vehicle, for example. Fig. 3 is a transverse section taken on the line 3—3 of Fig. 2. Fig. 4 is a vertical section taken on the line 4—4 of Fig. 2. Fig. 5 illustrates how the device may be applied to both sides of a vehicle.

In the drawings, A represents a portion of the body and B the axle of a vehicle to which the shock absorber has been attached. As shown, this device comprises a cup-like cylinder C, which is suitably secured to the body A. Within this cup is contained a retarding fluid, such as oil, and suitable mechanism designed to coöperate with the same. This cup is provided with a cover D, integral with which are two flanges E and F which, when the cover is in place, project into the cylinder, forming a partition therein, which divides the interior into two compartments. The closeness of the fit between these flanges and the sides and bottom of the cup may be adjusted to any suitable degree. The cover D it will be seen is made so as to fit snugly within the cup and is provided with a flange which rests upon a ledge Q near the mouth of the cup. After it is once in position the metal around the lip R of the cup is folded over as shown pinching the cover in position and insuring a tight joint which will insure against leakage after the device goes into use. The said cover D is provided with a bearing, through which a spindle G passes. This spindle is provided with a member, which may be termed a rotary piston, which comprises the wings H and I. This spindle and piston are pivoted on the boss M, which is located in the center of the bottom of the cup. These piston wings are provided with suitable check valves $h$ and $i$, which permit the fluid contained within the cup to pass therethrough when the piston is rotating in one direction, but not while rotating in the opposite direction. The bearing is provided with a collar J, through which the spindle passes and which is contained within the bearing box K. Next to this ring there is provided, as shown, the usual packing material, which packing material is followed by the usual wedge collar, which latter is in turn controlled by the cap L which, as shown, is screwed to the walls of the bearing box K. This cap L, as shown in Fig. 1, is provided with lugs M, which are engaged by a spring catch N to prevent it from working loose. The end of the spindle G beyond the packing box is designed to receive a crank arm O. This arm, as shown, is pivotally linked to the rod P, which is rigidly secured to the axle B.

The manner in which the device operates is as follows: When the vehicle to which the device is attached strikes and passes over a bump or depression in the road, the relative movement downward of the body A, with respect to the axle B, causes the spindle G and the wings H and I to rotate in a counter-clockwise direction, as viewed in Fig. 3. The valves in the wings H and I permit the fluid to pass through them freely during the movement in this direction, and little or no resistance is offered to the downward movement of the wheel. However, as the wings H and I begin to rotate in the opposite direction, when the body of the vehicle begins to move upward, the valves close and the fluid cannot now pass through them, but is forced to escape through the spaces left near the walls of the cup. These spaces are, of course, adjusted to permit the escape to take place at any suitable rate. Of course, it is perfectly obvious that the valves $h$ and $i$ may be placed on the opposite sides of their respective wings, in which case the action is the reverse of that above described.

It will be observed by referring to Fig. 5, that the opening in the head D through which the spindle G passes is considerably larger than the spindle. The object in this arrangement is to permit the oil or other fluid used within the cylinder being supplied at this point. After the oil has been supplied the washer J, which fits closely over the spindle G, is slipped into place to cover this opening and at the same time hold the spindle G in position. This washer, together with the packing that is immediately next to it produces a bearing tight enough to prevent leakage of the oil or other fluid.

It will be seen therefore that we provide a highly efficient and much simpler shock absorber than heretofore has been provided in the art and consequently a device which can be made cheaper than others of the kind.

What we claim is:

In a shock absorber, a chamber, a head therefor, a ledge around the chamber for supporting the head, the latter secured in position against the edge by folded metal from the chamber, the shaft passing through said head, a gland for said shaft on said head, a set of teeth on the gland, and a latch on the head for locking the gland against rotation.

Signed by us at Chicago, Cook county, Illinois, this 14 day of January, 1913.

ALEXANDER E. KEITH.
MICHAEL SETTER.

Witnesses:
ARTHUR J. RAY,
ALBERT ANDERSEN.